(12) United States Patent
Wu et al.

(10) Patent No.: US 9,457,913 B2
(45) Date of Patent: Oct. 4, 2016

(54) SYSTEM AND METHOD FOR DETECTING AN AIRCRAFT JITTER

(71) Applicant: AIR CHINA LIMITED, Beijing (CN)

(72) Inventors: Jiaju Wu, Beijing (CN); Zhuping Gu, Beijing (CN); Lei Huang, Beijing (CN); Huifeng Ding, Beijing (CN); Fengliang Zheng, Beijing (CN); Qifeng Ren, Beijing (CN); Yanfeng Zhang, Beijing (CN)

(73) Assignee: Air China Limited, Beijing (CN)

( * ) Notice: Subject to any disclaimer, the term of this patent is extended or adjusted under 35 U.S.C. 154(b) by 60 days.

(21) Appl. No.: 14/339,349

(22) Filed: Jul. 23, 2014

(65) Prior Publication Data
US 2015/0203211 A1    Jul. 23, 2015

(30) Foreign Application Priority Data

Jul. 24, 2013  (CN) .......................... 2013 1 0313837

(51) Int. Cl.
| | |
|---|---|
| G06F 7/70 | (2006.01) |
| B64D 43/00 | (2006.01) |
| G01M 9/06 | (2006.01) |
| B64F 5/00 | (2006.01) |

(Continued)

(52) U.S. Cl.
CPC ........... *B64D 43/00* (2013.01); *B64D 45/0005* (2013.01); *B64F 5/0045* (2013.01); *G01M 7/00* (2013.01); *G01M 9/06* (2013.01); *B64D 2045/0085* (2013.01)

(58) Field of Classification Search
CPC .............. B64D 43/00; B64D 45/0005; B64D 2045/0085; B64F 5/0045; G01M 7/00; G01M 9/06
USPC ............................... 701/14, 434, 428; 706/20
See application file for complete search history.

(56) References Cited

U.S. PATENT DOCUMENTS

| 4,506,551 A * | 3/1985 | Ray ........................... G01H 1/00 340/683 |
|---|---|---|
| 8,089,375 B1 * | 1/2012 | Seah .................... G08G 5/0021 340/971 |
| 2005/0277872 A1* | 12/2005 | Colby, Jr. ............ A61B 5/0022 604/67 |

(Continued)

FOREIGN PATENT DOCUMENTS

| EP | 2604522 A1 | 6/2013 |
|---|---|---|
| JP | 2009276282 A | 11/2009 |

OTHER PUBLICATIONS

Belvin, W. Keith,Spacecraft Jitter Attenuation Using Embedded Piezoelectric Actuators,Jun 28, 1995,Document ID: 19960024186, pp. 1-11, Accession Number: 96N26739.*

(Continued)

*Primary Examiner* — Shardul Patel
(74) *Attorney, Agent, or Firm* — Husch Blackwell LLP

(57) ABSTRACT

The present invention relates to a system and method for detecting an aircraft jitter. The aircraft jitter detection system comprises: a jitter detection apparatus, which detects accelerations of pitch and yaw of the aircraft; a data acquisition apparatus, which obtains accelerations in two directions detected by the jitter detection apparatus; and a jitter determination apparatus, which extracts frequency spectrum and energy information of the jitter according to the accelerations in two directions obtained by the data acquisition apparatus, and determines whether the aircraft jitters.

21 Claims, 7 Drawing Sheets

(51) Int. Cl.
*G01M 7/00* (2006.01)
*B64D 45/00* (2006.01)

(56) References Cited

U.S. PATENT DOCUMENTS

| | | | | | |
|---|---|---|---|---|---|
| 2009/0276282 | A1* | 11/2009 | Smith | ............... | G06Q 10/1093 705/7.18 |
| 2010/0057277 | A1* | 3/2010 | Goodrich | ............... | G07C 5/085 701/14 |
| 2010/0085890 | A1* | 4/2010 | Hinnant, Jr. | ........... | G01D 21/00 370/253 |
| 2010/0318336 | A1* | 12/2010 | Falangas | ............ | G06F 17/5095 703/8 |
| 2011/0047112 | A1* | 2/2011 | Ketabdar | ............. | G01S 5/0018 706/20 |
| 2013/0158891 | A1* | 6/2013 | Niepokolczycki | ....... | G01H 1/00 702/33 |
| 2013/0181086 | A1* | 7/2013 | Bielas | .................. | G01C 25/005 244/3.22 |
| 2014/0106333 | A1* | 4/2014 | Dugan | ................... | B64D 47/02 434/428 |

OTHER PUBLICATIONS

European search report for application No. 14178428.0 dated Mar. 9, 2015, 11 pages.
Whiteley et al., Aero-optical jitter estimation using higher-order wavefronts, Optical Engineering vol. 52(7), Jul. 2013, 12 pages.
Belvin, Spacecraft Jitter Attenuation Using Embedded Piezoelectric Actuators, NASA Langley Research Center, International Forum on Aeroelasticity and Structural Dynamics, Jun. 1995, 16 pages.
Abstract for Merritt et al., Angular vibration survey of various aircraft, Laser Systems Technology, Apr. 2003, 2 pages.

* cited by examiner

SYSTEM AND METHOD FOR DETECTING AN AIRCRAFT JITTER

TECHNICAL FIELD

The present invention relates to an airborne system and method, in particular to a system and method for detecting an aircraft jitter.

BACKGROUND ART

During the climb or cruise stage of an aircraft, free strokes of cabin door of the aircraft, cover plate of the aircraft belly, ailerons and flaps of the aircraft, cabin door of the landing gear, flight control surface and other components will cause a part of those components abnormally swinging with airflow, and further make the aircraft jitter due to aerodynamic force. The jitter of the aircraft may he felt particularly obviously in the cockpit and the tail. Although such jitters will not threaten flight safety, it will have great influence on the operation of the aircrew and comfort level of the passengers on board. The aircrew will not be able to concentrate on their operation and providing services due to the jitter of aircraft, while the passengers on board will become restless and anxious.

In prior art, determination of aircraft jitter mainly depends on reports from the aircrew based on their personal feelings. However, since personal feelings in these reports are often inaccurate, and sometimes there is no malfunction that actually occurred or it is necessary to conduct an overall examination to the aircraft since the source of the jitter cannot be located. Such examination requires a lot of work, and is difficult to perform. In order to avoid the above situation, the maintenance-engineering department will shorten the time interval for maintaining some components, which causes great increase in maintenance cost.

SUMMARY

For the above technical problem in prior art, according to one aspect of the present invention, there is provided an aircraft jitter detection system, comprising: a jitter detection apparatus, which detects accelerations of pitch and yaw of the aircraft; a data acquisition apparatus, which obtains accelerations in two directions detected by the jitter detection apparatus; and a jitter determination apparatus, which extracts frequency spectrum and To energy information of the jitter according to the accelerations in two directions obtained by the data acquisition apparatus and determines whether the aircraft jitters.

The system as described above further comprises: a mode comparison apparatus, which estimates component that jitters by comparing frequency is and direction information of the aircraft jitter with a jitter caused by an already-known jitter source.

For the system as described above, wherein the jitter detection apparatus comprises an inertial navigation computer of the aircraft, an inertial navigation platform or an accelerometer with a three-axis gravity acceleration sensor.

For the system as described above, wherein the data acquisition apparatus comprises the DMU, QAR or FDR of the aircraft or a high frequency sampling independent hardware apparatus.

The system as described above further comprises a message generation apparatus and a communication apparatus. The message generation apparatus generates a jitter data message according to the acceleration data in two directions of the aircraft obtained by the data acquisition apparatus; the communication apparatus transmits the jitter data message to the jitter determination apparatus on the ground via an air-ground data link system.

The system as described above further comprises a jitter recording starting system For the system as described above, wherein the jitter detection apparatus, the data acquisition apparatus or the message generation apparatus initiates detection of jitter at the climb or cruise stage of the aircraft.

For the system as described above, wherein at the time when the aircraft starts to climb or 10 seconds or 20 seconds after the aircraft starts to climb, the jitter detection apparatus, the data acquisition apparatus or the message generation apparatus initiates detection of jitter; or when the aircraft starts to climb at a speed larger than 260 knots, the jitter detection apparatus, the data acquisition apparatus or the message generation is apparatus initiates detection of jitter; or, when the aircraft is in a steady-state cruise condition or around 40 seconds after the aircraft is in a steady-state cruise condition, the jitter detection apparatus, the data acquisition apparatus or the message generation apparatus initiates detection of jitter.

For the system as described above, wherein the jitter determination apparatus determines frequency spectrum and energy information of the jitter according to the accelerations in two directions at a certain time point obtained by the data acquisition apparatus.

For the system as described above, wherein the jitter determination apparatus processes the acceleration data in two directions of pitch and yaw of the aircraft at a certain time point via the Fourier Transform and obtains spectrum distribution of the jitter.

For the system as described above, wherein the sitter determination apparatus processes the acceleration data in two directions of pitch and yaw of the aircraft at a certain time point via Smooth-Pseudo Wigner-Ville Distribution and/or Wavelet Transform, and obtains energy distribution of the jitter.

For the system as described, wherein the jitter determination apparatus determines the existence of a jitter when the jitter energy exceeds a preset threshold value.

For the system as described above, wherein the preset threshold value is energy density of the jitter larger than 150 db and amplitude of the jitter after being transformed via Fourier Transform larger than 0.0003 $m^2/s/Hz$.

For the system as described above, wherein the mode comparison apparatus determines source of the jitter in combination with location information of the jitter According to another aspect of the present invention, there is provided a method for detecting an aircraft jitter, comprising: detecting accelerations of pitch and yaw of the aircraft; obtaining accelerations in two directions detected by the jitter detection apparatus; and extracting frequency spectrum and energy information of the jitter according to the accelerations in two directions obtained by, the data acquisition apparatus, and determining whether the aircraft jitters.

The method as described above further comprises estimating component that jitters by comparing frequency and direction information of the aircraft jitter with a jitter caused by an already-know jitter source.

The method as described above further comprises generating a jitter data message according to the acceleration data in two directions of the aircraft obtained by the data acquisition apparatus.

The method as described above further comprises transmitting the jitter data message to the ground via an air-ground data link system.

The method as described above further comprises initiating detection of jitter during the clime or cruise stage of the aircraft.

For the method as described above, wherein at the time when the aircraft starts to climb or around 10 seconds or 20 seconds after the aircraft starts to climb, initiating detection of jitter; or when the aircraft starts to climb at a speed larger than 260 knots, initiating detection of jitter; or when the aircraft is in a steady-state cruise condition or around 40 seconds after the aircraft is in a steady-state cruise condition, initiating detection of jitter.

The method as described above further comprises processing the acceleration data in two directions of pitch and yaw of the aircraft at a certain time point via the Fourier Transform, and obtaining spectrum distribution of the jitter.

The method as described above further comprises processing the is acceleration data in two directions of pitch and yaw of the aircraft at a certain time point via Smooth-Pseudo Wigner-ville Distribution and/or Wavelet Transform, and obtaining energy distribution of the jitter.

The method as described above further comprises determining the existence of a jitter when the jitter energy exceeds a preset threshold value. For the method as described above, wherein the preset threshold value is energy density of the jitter larger than 150 db, and amplitude of the jitter after being transformed via Fourier Transform larger than 0.0003 m$^2$/s/Hz.

The method as described above further comprises determining source of the jitter in combination with location information of the jitter.

According to another aspect of the present invention, there is provided a method for maintaining malfunction of an aircraft jitter, comprising: obtaining jitter data, wherein the jitter data comprise accelerations in two directions of pitch and yaw of the aircraft at a certain time point; and obtaining frequency spectrum and energy distribution information of the jitter, and determining whether the jitter actually happens.

The method as described above further comprises determining a possible source of the jitter malfunction according to frequency and direction of the jitter.

The method as described above further comprises determining a possible source of the jitter malfunction according to frequency and direction of the jitter as well as location information of the jitter.

The method as described above further comprises maintaining jitter malfunction of the aircraft according to the resulting possible source of the jitter malfunction.

According to another aspect of the present invention, there is provided a method for maintaining an aircraft, comprising: building a system for detecting an aircraft jitter as described above, or utilizing a method for detecting an aircraft jitter as described above; and extending the time interval for replacing the component of the aircraft where a jitter might occur.

For the method as described above, wherein the component where a jitter might occur is one or more selected from the following group: rod end of the rudder, actuating cylinder of the rudder and rod end of the elevator.

DESCRIPTION OF DRAWINGS

Hereinafter, preferred embodiments of the present invention will be described in greater detail, taken in conjunction with the accompanying drawings, wherein.

MODE OF THE INVENTION

Figure 1:
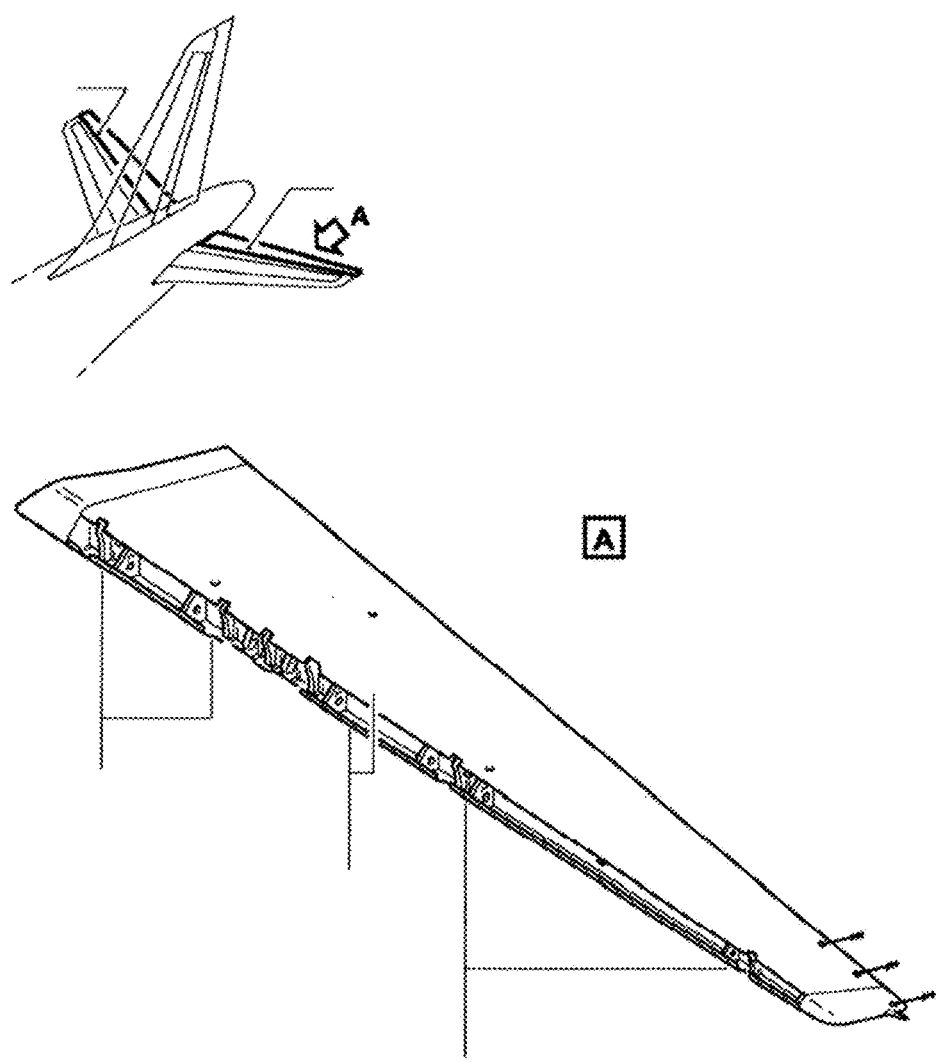
FIG. 1 is a schematic of the structure of an elevator of an aircraft.

In order to present a clearer picture of the purpose, technical solutions and merits of embodiments of the present invention, technical solutions in embodiments of the present invention will be fully described below, taken in conjunction with accompanying drawings in embodiments of the present invention. Apparently, the illustrated embodiments are only a part of the embodiments of the present invention, rather than all of them. Based on embodiments in the present invention, all other embodiments a person skilled in the art achieves without any creative effort shall belong to the protection scope of the present invention.

In the following detailed description, reference may be made to each figure in the drawings of the specification, which forms a part of the present application and is used to illustrate specific embodiment of the present invention. In the drawings, similar symbols in different figures identify substantially similar assemblies. With the following detail description of each specific embodiment of the present application, an ordinary person with relevant knowledge and technology in the art will be able to implement technical solutions of the present application. It shall be appreciated that other embodiments may be utilized or changes in structure, logic and electric property may be made to embodiments of the present application.

An aircraft may jitter due to various reasons. As described in the Background Art, free strokes of cabin door of the aircraft, cover plate of the aircraft belly, ailerons and flaps of the aircraft, cabin door of the landing gear, flight control surface and other components all might cause an aircraft jittering. The following is an illustration of some characteristics of an aircraft jitter, by taking the elevator and rudder as an example. The elevator and rudder are two components of aircraft where jitter is most likely to happen.

FIG. 1 is a schematic of the structure of an elevator of an aircraft. As shown in FIG. 1, the left and right sides of the aircraft tail are each provided with an elevator. The actuating cylinder of the elevator controls angle of the control surface of the elevator via a hinge, thus realizing rise and fall of the aircraft For the elevator, the actuating cylinder and the hinge both may get loose, thus free strokes may be created. It also might be that the gap between the actuating cylinder and the hinge is overlarge, thus causing the free stroke. The occurrence of free strokes might causes an aircraft jittering.

Figure 2:
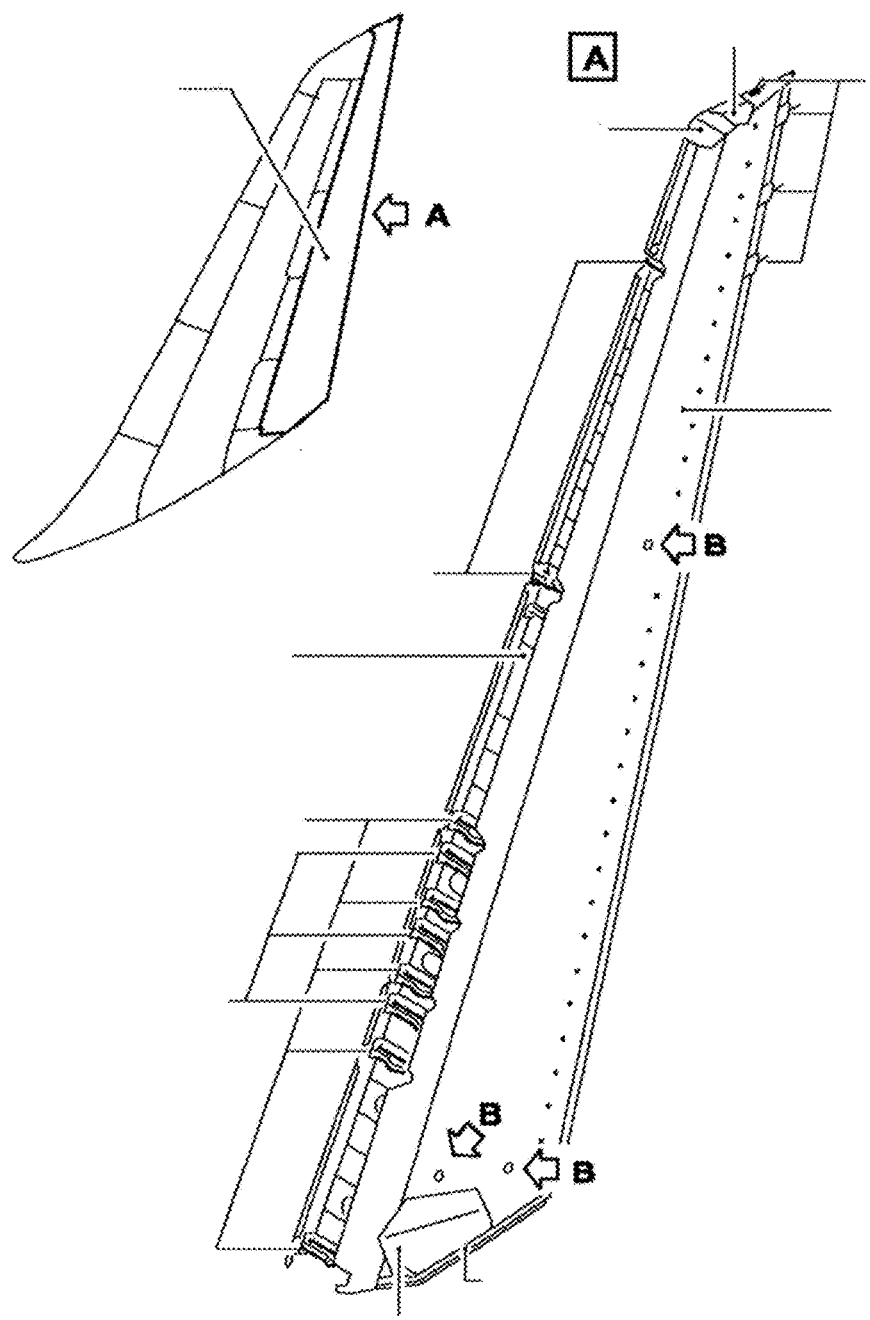
FIG. 2 is a schematic of the structure of a rudder of an aircraft.

FIG. 2 is a schematic of the structure of a rudder of an aircraft. As shown in FIG. 2, a rudder is provided at the middle portion of the aircraft tail. The actuating cylinder of the rudder controls angle of the control surface of the rudder via a hinge, thus diverting the aircraft. Similarly, actuating cylinder and hinge of the rudder may also get loose, thus causing free stroke, and further causing the aircraft jitter.

Free stroke might occur to the cabin, door of the aircraft, cover plate of the aircraft belly, aileron and flap of the aircraft, and cabin door of the landing gear if some components thereof get loose. Free stroke might also occur if some components are not at the place where they are supposed to be due to improper operation of the operator, thus causing the aircraft jittering.

After research, inventors of the present application found that jitters of different locations or different components have their own specific characteristics. For example, they greatly vary in frequency and direction. Jitters of the cabin door or the cover plate have high frequency, above 100 0 Hz in general; while frequency of jitter of the control surface, is not high, below 20 Hz in general. Besides, those jitters are also different in their directions. For example, jitter of the elevator is up-and-down while jitter of the rudder is right-and-left. Causes for different jitters may be distinguished if in combination with the difference locations of the occurrence of jitter, and thus location of possible malfunction may then be determined. It may greatly reduce time for troubleshooting malfunction of an aircraft jitter, improve airworthiness time of the aircraft, extend fixed maintenance time period of some components, and reduce maintenance cost. The present invention is illustrated by taking an aircraft of A320 family as an example. The present invention may also be applied to Aircrafts of other types or similar systems.

Figure 3:
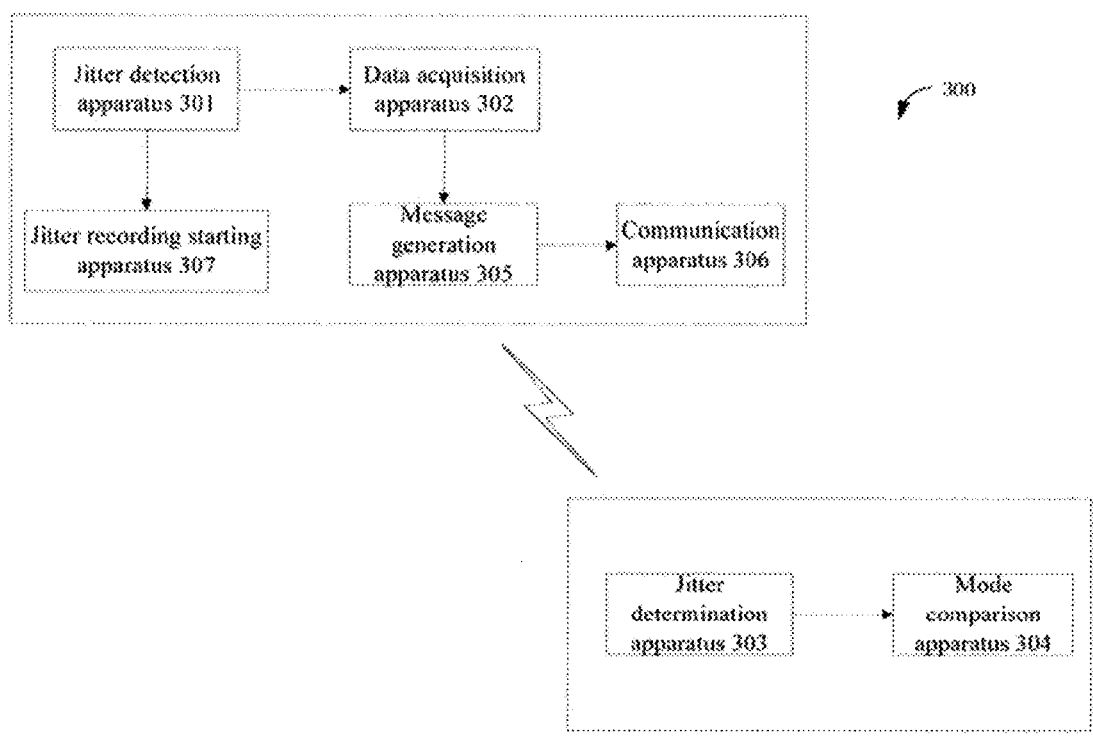
FIG. 3 is a schematic of the structure of a system for detecting an aircraft jitter according to one embodiment of the present invention.

FIG. 3 is a schematic of the structure of a system for detecting an aircraft jitter according to one embodiment of the present invention. As shown in FIG. 3, the aircraft jitter detection system 300 comprises a jitter detection apparatus 301, a data acquisition apparatus 302, a jitter determination apparatus 303, and a mode comparison apparatus 304.

The jitter detection apparatus 301 detects accelerations in pitch (namely up-and-down direction) and yaw (namely right-and-left direction) of the aircraft. Changes in accelerations in those directions may reflect jitters of to the aircraft in those directions.

The data acquisition apparatus 302 obtains accelerations in two directions detected by the jitter detection apparatus 301, and is capable of storing those accelerations information. The jitter determination apparatus 303 extracts frequency spectrum and energy information of the jitter according to accelerations in two directions obtained by the data acquisition apparatus 302, and determines whether the aircraft jitters according to the extracted information. The mode comparison apparatus 304 estimates the component causing the jitter by comparing frequency and/or location information of the aircraft jitter with a jitter caused by an already-known jitter source.

According to one embodiment of the present invention, one example of the jitter detection apparatus 301 is inertial navigation computer of an aircraft. The inertial navigation computer is an important component of an aircraft, comprising a laser gyroscope and a three-axis accelerometer. During the flight, the inertial navigation computer calculates, at all times, accelerations of the aircraft in pitch (namely up-and-down direction) and yaw (namely right-and-left direction) according to the aircraft's location with respect to the reference plane defined by the laser gyroscope, thus determining posture of the aircraft and providing information of the posture to the cockpit of the aircraft. Therefore, the inertial navigation computer of the aircraft may be applied into the technical solutions of the present invention to detect, information related to an aircraft jitter.

According to one embodiment of the present invention, one example of the jitter detection apparatus 301 is inertial navigation platform of an aircraft. Inertial navigation platform is an apparatus applied in early aircrafts, whose function is similar to the existing inertial navigation computer. Therefore, if) the inertial navigation platform may also be applied in the present invention.

According to one embodiment of the present invention, one example of the jitter detection apparatus 301 is an independent hardware apparatus, comprising an accelerometer having a three-axis gravity acceleration sensor. The accelerometer may also be used for detecting; accelerations in two directions of the aircraft, and thus may also be applied in the technical solutions of the present invention.

According to one embodiment of the present invention, the digital Flight Data Interface and Management Unit (FDIMU) is utilized in the present invention. The FDIMU receives data of aircraft condition from airborne sensors or other devices. The data acquisition subsystem of the FDIMU converts the obtained data of aircraft condition into digital signals for broadcasting. The Quick Access Recorder (QAR) receives and stores the broadcast data of aircraft condition. Wherein one part of the data is stored in the Flight Data Recorder (FDR), namely the "Black Box", so as to be analyzed by relevant person after an emergency happened to the aircraft The Aircraft Condition Monitoring System (ACMS) also receives data of aircraft condition broadcast by the data acquisition subsystem of FDIMU. The ACMS monitors, collects and records data of aircraft condition, and outputs predetermined data of aircraft condition under a certain trigger condition, and the output data may be used by flight crew and maintenance staff to monitor the aircraft condition and performances on a daily basis. It is referred to as Message as its data content and format may be changed by users.

The ACMS message is generated under the control of integrated application software. A message is triggered by threshold of a certain parameter of aircraft condition or combinational logic of multiple specific parameters of aircraft condition, namely, by a certain message triggering logic. The ACMS message generated by the message triggering logic designed and tested by the ACMS producer is referred to as Basic Message. Many basic messages have, already become standards stipulated by Civil Aviation Administration Authority. Take aircrafts of A320 family as an example, the number of ACMS basic messages they use is over 20.

A customized message may be generated by the user via designing an ACMS message trigger logic. With the customized message, a person skilled in the art may be no longer restricted by the parameters in the basic messages, and may directly face thousands of parameters of aircraft condition, which will facilitate monitoring the aircraft condition.

According to one embodiment of the present invention, one example of the data acquisition apparatus 302 is DMU, QAR or FDR of the FDIMU of the aircraft.

According to one embodiment of the present invention, one example of the data acquisition apparatus 302 is an independent hardware volatile or nonvolatile data storage apparatus. Since the sampling frequency of the DMU of FDIMU is limited, not larger than 32 Hz (32 times a second) in general, data of some jitters with high frequency cannot be obtained. Such problem may be avoided by using a data acquisition apparatus with high sampling frequency.

According to one embodiment of the present invention, one example of the jitter determination apparatus 303 is main control computer, secondary computer of the aircraft, ACMS of FDIMU or other airborne computers or a computing platform on the ground.

According to one embodiment of the present invention, one example of the mode comparison apparatus 304 is main control computer, secondary computer of the aircraft, ACMS or other airborne computers or a computer on the ground. That is to say, the data acquisition apparatus 302 and the mode comparison apparatus 304 may be implemented at the same airborne computer platform or different computer platforms.

According to one embodiment of the present invention, since the main control computer, secondary computer of the aircraft, ACMS of the FDIMU or other airborne computers have their own respective tasks and do not have any more computing resource, and it needs a lot of computing for obtaining frequency spectrum and energy information of a jitter, the jitter determination apparatus 303 and the mode comparison apparatus 304 are preferred to be a computing platform on the ground.

According to one embodiment of the present invention, the aircraft jitter detection system 300 comprises a message generation apparatus 305 and a communication apparatus 306. The message generation apparatus 305 generates a jitter data message according to acceleration data in two directions of the aircraft obtained by the data acquisition apparatus 302. According to one embodiment of the present invention, since the amount of acceleration data is relatively large, the message generation apparatus will generate more than one jitter data message so as to ensure a smooth transmission of messages. The communication apparatus 306 transmits the messages to the jitter determination apparatus 303.

According to one embodiment of the present invention, one example of the message generation apparatus 305 is the ACMS of FDIMU or other airborne message generation apparatus. According to one embodiment of the present invention, one example of the communication apparatus 306 is for example, the ground-air data link of ACARS system. Jitter data messages are transmitted via the ground-air data link to a ground workstation, and further being transmitted to a ground computing platform or a server of the airline company.

According to one embodiment of the present invention, the aircraft jitter detection system 300 comprises a jitter recording starting apparatus 307. Jitter does not happen all the time, but has certain randomness. Therefore, except for detecting jitter during the climb and cruise stages of the aircraft during which jitter is relatively likely to occur, the additional jitter recording starting apparatus 307 may be started by the flight crew or flight attendants so as to obtain jitter data when a jitter happens. According to one embodiment of the present invention, the jitter recording starting apparatus 307 is connected to the jitter detection apparatus 301 to start the entire jitter detection process, which is very helpful when the jitter detection apparatus 301 is an independent hardware. According to one embodiment of the present invention, the jitter recording starting apparatus 307 is connected to the data acquisition apparatus 302 to start the entire jitter detection process, which is very helpful when the data acquisition apparatus 302 is an independent hardware. According to one embodiment of the present invention, the jitter recording starting apparatus 307 is connected to the message generation apparatus 305 to start the jitter data acquisition and jitter message generation process.

Figure 4:
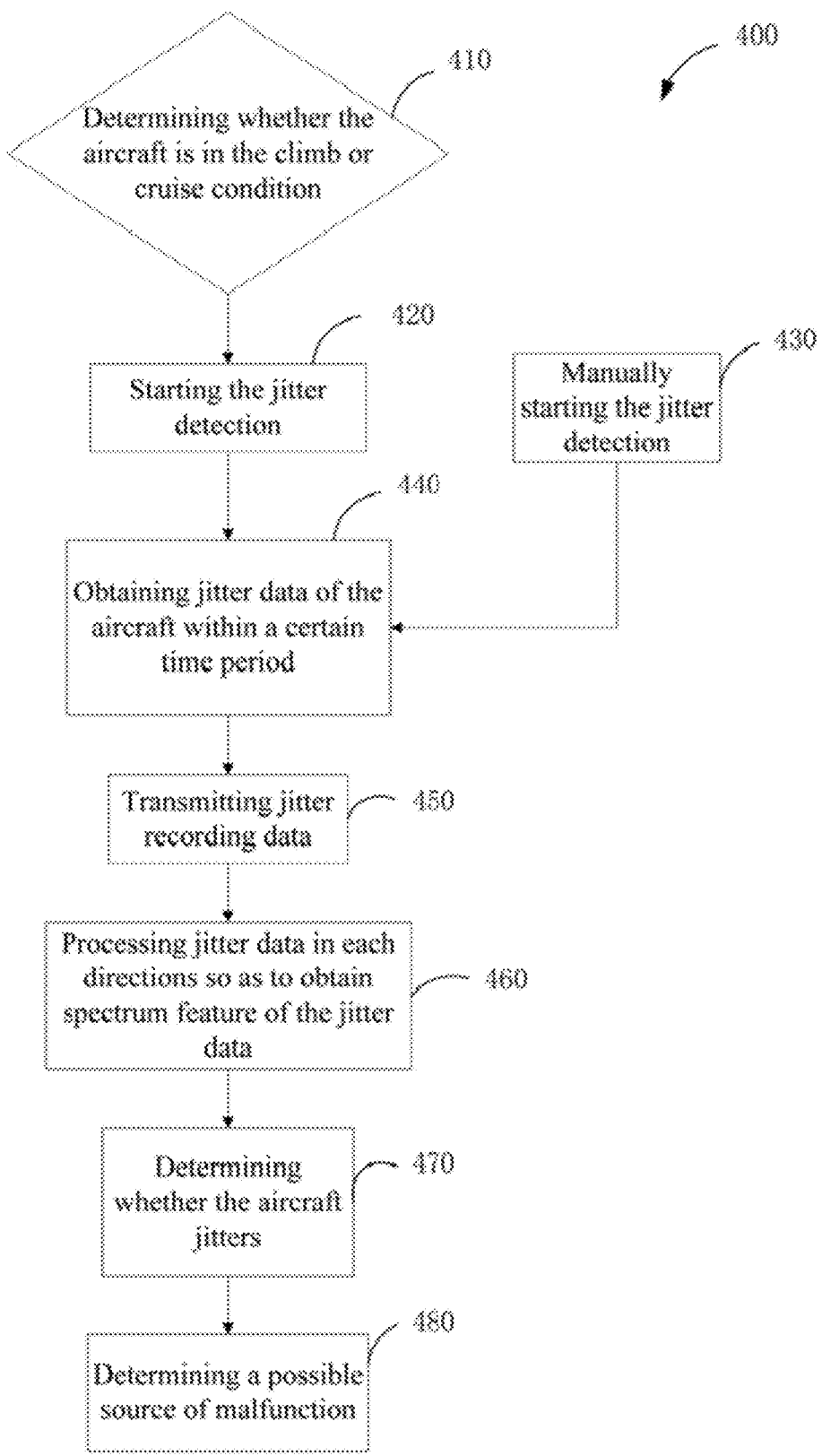
FIG. 4 is a flow chart illustrating a method of detecting an aircraft jitter according to one embodiment of the present invention.

FIG. 4 is flow chart illustrating a method for detecting an aircraft jitter according to one embodiment of the present invention. As one application, s the method for detecting an aircraft jitter in FIG. 4 may be used in the system for detecting an aircraft jitter in the embodiment illustrated in FIG. 3.

As shown in FIG. 4, the aircraft jitter detection method 400 comprises: in step 410, determining whether the aircraft is in the climb or cruise condition; in step 420, if the aircraft is in the climb condition or the cruise condition, then starting the jitter detection apparatus 301, the data acquisition apparatus 302 or the message generation apparatus 305 to initiate detection of jitter.

According to one embodiment of the present invention, at the time when the aircraft starts to climb or a time period after the aircraft starts to is climb, preferably 10 seconds or 20 seconds after the aircraft starts to climb, initiating detection of jitter. According to one embodiment of the present invention, when the aircraft starts to climb at a speed larger than 260 knots, initiating detection of jitter. According to one embodiment of the present invention, when the aircraft is in a steady-state cruise condition, initiating detection of jitter; or after a time period since the aircraft is in a steady-state cruise condition, preferably after 40 seconds or longer since the aircraft is in a steady-state cruise condition, initiating detection of jitter.

Or, in step 430, the flight crew or flight attendants may use the jitter recording starting apparatus 307 to manually start the jitter detection apparatus 301, the data acquisition apparatus 302 or the message generation apparatus 305 to initiate, detection of jitter.

After the detection of jitter is initiated, in step 440, the data acquisition apparatus 302 obtains jitter data of the aircraft within a certain time period from the jitter detection apparatus at a fixed time interval. Or, the message generation apparatus 305 obtains jitter data of the aircraft within a certain time period from the data acquisition apparatus 302, such as the DMU, QAR, or FDR of FDIMU, or the hardware-independent data acquisition apparatus 302.

Jitter data comprise but are not limited to accelerations in two directions of pitch (namely up-and-down direction) and yaw (namely right-and-left direction) of the aircraft. According to one embodiment of the present invention, acceleration in the front-back direction has little influence on the jitter, and thus can be obtained or be omitted. As described previously, if the jitter recording apparatus is DMU, QAR or FDR of FDIMU, the sampling frequency of those apparatuses are limited in many aircrafts nowadays, with the highest only reaching 32 times per second, namely 32 Hz. If the data acquisition apparatus 302 is a hardware or software specifically designed for recording jitter, then it may not be limited by the sampling frequency, and aircraft jitter with broader frequency scope may be detected.

According to one embodiment of the present invention, in order to determine mode of the jitter, the data acquisition apparatus 302 obtains jitter data of 20 to 120 seconds; preferably, jitter data of 20 to 60 seconds or 20 to 40 seconds.

In step 450, jitter recording data of the accelerations in two directions of pitch (namely up-and-down direction) and yaw (namely right-and-left direction) are transmitted to a ground workstation via the communication apparatus 306 by using for example the air-ground data link of ACARS, and further being transmitted to a computing platform or a data server of the airline company.

Since the main control computer, secondary computer, ACMS or other airborne computers on the aircraft have their own tasks during the flight, and processing the jitter data requires large amount of computing resources and jitter will not affect flight safety in general, therefore, it is a good choice to send the jitter data to a ground server for processing. Of course, the step 450 is optional, and those computing processes may also be performed on an airborne computer.

According to one embodiment of the present invention, the message generation apparatus 305 transmits the recorded jitter data within a certain time period to a ground server via a series of messages. For example, the jitter data comprising accelerations in two directions of pitch (namely up-and-down direction) and yaw (namely right-and-left direction) are transmitted to a ground server via 5 jitter messages.

According to one embodiment of the present invention, the jitter message comprises three portions: the first portion comprises message preset parameters, such as: aircraft number, flight number, air speed, engine rotational speed and so forth; the second portion comprises; legs of flight, starting time and ending time for recording the jitter and so forth; the third portion is the main portion of the message, comprising accelerations of the aircraft in two directions of pitch (namely up-and-down direction) and yaw (namely right-and-left direction) at different time points.

Return to FIG. 4, in step 460, in the jitter determination apparatus 303, processing jitter data in each directions so as to obtain spectrum feature of the jitter data. According to one embodiment of the present invention, the data acquisition apparatus further obtains energy feature of the jitter data. As described previously, jitters caused by different jitter sources have their relatively unique frequencies. Mode of the jitter may be determined via the spectrum feature of the jitter data. With the energy feature of the jitter data, it can be determined whether the aircraft actually jitters, and disturbance jitters with low jitter energy may be omitted so as to avoid misreport.

According to one embodiment of the present invention, the originally sampled acceleration data in two directions of pitch (namely up-and-down direction) and yaw (namely right-and-left direction) of the aircraft are processed via Fourier Transform, Smooth-Pseudo Wigner-ville Distribution and Wavelet. Transform so as to obtain spectrum and energy distribution of the jitter. It shall be appreciated by persons skilled in the art that the above to analyzing method is only described as an example, other spectrum analysis, analog method and/or numerical analysis method may also he used for analyzing jitter data so as to obtain frequency and energy feature of jitter data.

In step 470, the jitter determination apparatus 303 determines whether the aircraft jitters. According to one embodiment of the present invention, the occurrence of jitter is determined only if the energy density of the jitter is larger than 150 db (preferably 200 db) and the amplitude of the jitter after being processed via Fourier Transform is larger than 0.0003 (preferably 0.0005) $m^2/s/Hz$. Aircrafts of different types may vary in size and structure, and thus the threshold value for determining the occurrence of a jitter may be different. Via step 470, a majority of disturbances with low energy may be excluded so as to determine the real occurrence of a jitter.

Figure 5:
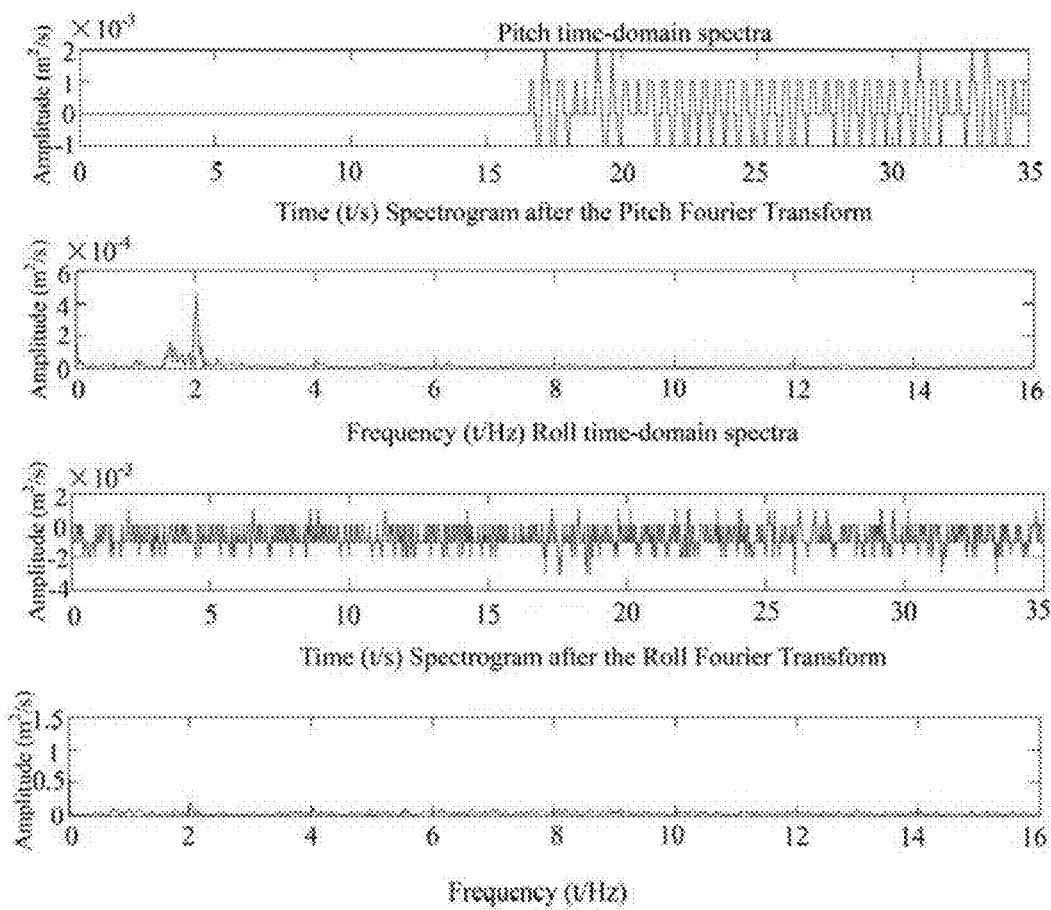
FIG. 5 shows the spectrum data resulted after jitter data in pitch (namely up-and-down direction) and yaw (namely left-and-right direction) are processed via Fourier Transform.

FIG. 5 shows data of spectrum resulted after the jitter data in pitch (namely up-and-down direction) and yaw (namely right-and-left direction) is are process via Fourier Transform according to one embodiment of the present invention. This serves as a testifying embodiment. In this embodiment, airfoil of the aircraft is provided with a vertical jitter source of 2 Hz. Jitter data for this jitter source may he obtained by using the above described system and method of the present invention.

As shown in FIG. 5, the data of spectrum resulted after the jitter data in the pitch (namely up-and-down direction) are converted via Fourier Transform has a peak value in a region near 2 Hz. While the data of spectrum resulted after the jitter data in the yaw (namely right-and-left direction) are converted via Fourier Transform does not have any peak value. As a result, it can be determined that a jitter around 2 Hz might occur to the aircraft.

Figure 6:
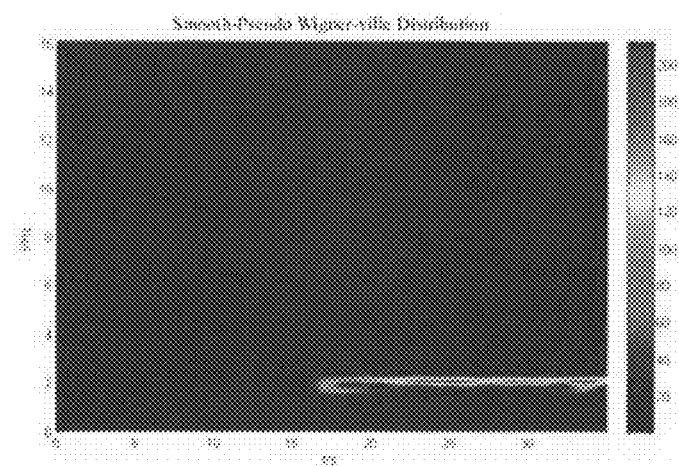
FIG. 6 is a schematic of the amplitude (namely energy) distribution resulted after the jitter data in the embodiment of FIG. 5 are processed via Smooth-Pseudo Wigner-ville Distribution.

FIG. 6 is a schematic of the distribution of amplitude (namely energy) resulted after the jitter data in the embodiment of FIG. 5 are processed via Smooth-Pseudo Wigner-ville Distribution. As shown in FIG. 6, the region near 2 Hz has the highest energy density.

Figure 7:
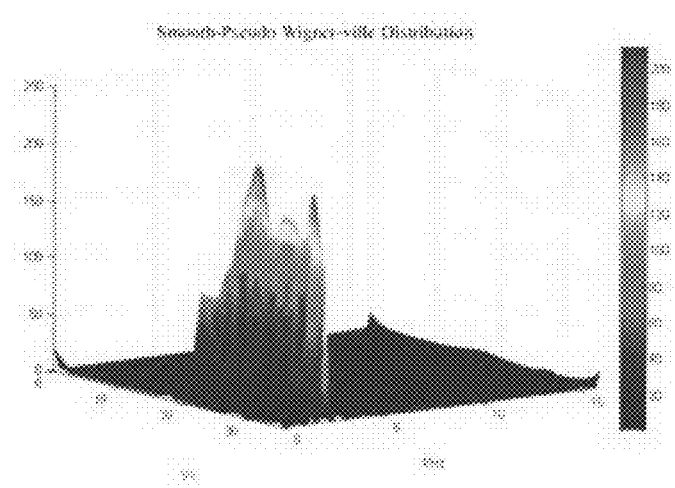
FIG. 7 is a schematic of the energy density distribution resulted after the distribution in the embodiment of FIG. 6 is further processed via Wavelet Transform.

FIG. 7 is a schematic of the energy density distribution resulted after the distribution in the embodiment as described in FIG. 6 is further processed via Wavelet Transform. As can he seed more clearly from FIG. 7, there are jitters with high energy around 2 Hz.

Figure 8:
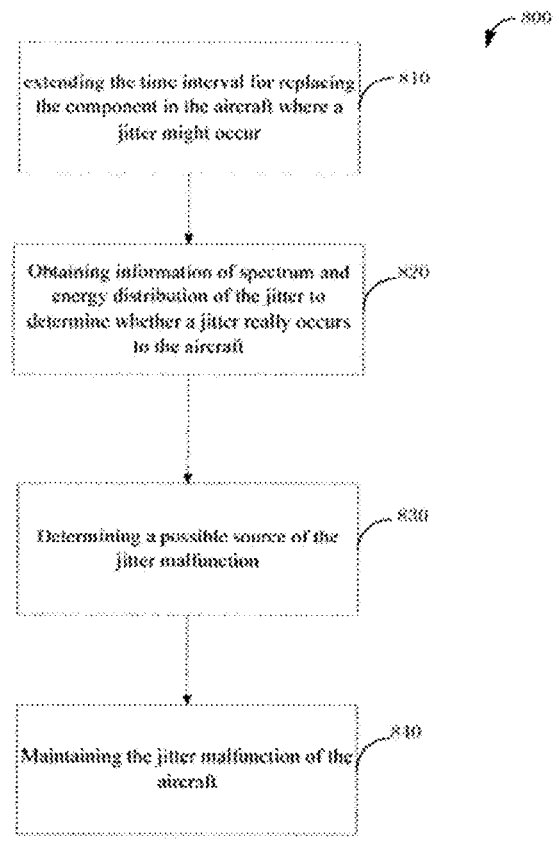
FIG. 8 is a method of maintaining malfunction of an aircraft jitter according to one embodiment of the present invention.

Referring to FIG. 5, the amplitude value of the jitter after its amplitude is converted is Fourier Transform is larger than 0.0003 $m^2/s/Hz$; and referring to FIG. 8, the energy density of the jitter is larger than 150 db. Hence, it can be determined that a jitter source of around 2 Hz jittering up and down really exists on the aircraft.

Return to FIG. 4, in step 480, in the mode comparison apparatus 304, determining a possible malfunction source by comparing the jitter direction and frequency feature obtained by the jitter determination apparatus 303 with already-known jitter modes. As described previously, source of the malfunction may be preliminarily determined according to already-known jitter modes. For example, the jitter frequency of the cabin door or the cover plate is very high, above 100 Hz in general; while, the jitter frequency of the control surface is not high in general, around 20 Hz. As for the direction of jitter, for example, the jitter direction of the elevator is up-and-down while the jitter direction of the rudder is right-and-left.

According to one embodiment of the present invention, one can determine source of a jitter more accurately in combination with location information of the jitter. Generally speaking, for jitters from different sources, flight crew or flight attendants at different locations in the cabin feel differently. This information is relatively accurate. Therefore, after determining the malfunction source, one may combine reports from the flight crew. According to one embodiment of the present invention, general location of the jitter may be determined according to sensors at different locations in the aircraft. This information is more accurate, and thus may serve as a basis for determining malfunction source of the jitter.

According to one embodiment of the present invention, one may determine malfunction source of a jitter by referring to the following table (since jitter is related to the structure of an aircraft, the followings are listed by taking jitter characteristics of aircraft of A320 family as an example):

| Malfunction Source | Frequency | Direction | Location with Strong Feelings |
|---|---|---|---|
| Elevator | Around 10 Hz | Up-and-down | Tail, Cockpit |
| Rudder | Around 10 Hz | Right-and-left | Tail, Cockpit |
| Cabin door (sound wave) | Around 180 Hz | No obvious sense of direction | Cockpit/middle of the cabin |
| Cover plate of the aircraft belly (sound wave) | Around 400 Hz | No obvious sense of direction | Cockpit/middle of the cabin |
| Jitter caused by rotation of front wheels of the landing gear | Around 40 Hz | No obvious sense of direction | Cockpit (feeling becomes strong when the landing gear is taken back, and the feeling fades away when the front wheels stop rotating) |
| aileron of Airfoil | Around 10 Hz | Combination of up-and-down and right-and-left | middle of the cabin, Cockpit |

FIG. 8 illustrating a method for maintaining malfunction of an aircraft jitter according to one embodiment of the present invention. As shown in FIG. 8, the method 800 for maintaining malfunction of an aircraft jitter comprises: in step 810, obtaining jitter data when jitter malfunction occurs to the aircraft, wherein the jitter data comprise accelerations in two directions of pitch (namely up-and-down direction) and yaw (namely right-and-left direction) of the aircraft within a certain time period. The system and method described in the above embodiments may be used for obtaining jitter data in the present embodiment.

In step 820, obtaining information of spectrum and energy distribution of the jitter so as to determine whether a jitter really occurs to the aircraft. The system and method described in the above embodiments may be used for obtaining information, on whether a jitter occurs in the present embodiment.

In step 830, a possible source of the jitter malfunction may be determined according to frequency and direction of the jitter and optionally location information of the jitter. The system and method as described in the above embodiments herein may be used for obtaining information of source of the jitter malfunction in the present embodiment.

In step 840, maintaining the jitter malfunction of the aircraft according to the possible source of jitter malfunction resulted in step 830.

Figure 9:
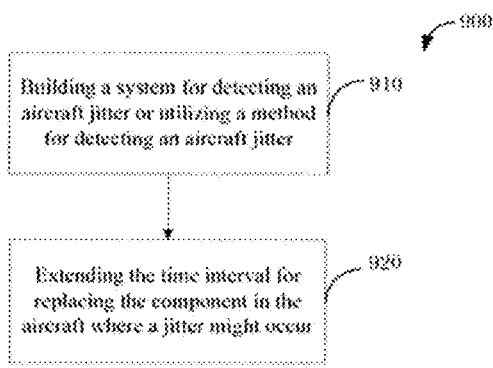
FIG. 9 is a method of maintaining an aircraft according to one embodiment of the present invention.

FIG. 9 illustrate a method for maintaining an aircraft according to one embodiment of the present invention. As shown in FIG. 9, the method 900 for maintaining an aircraft comprises: in step 910, building a system for the aircraft for detecting an aircraft jitter as describe previously in the present Is application, or utilizing a method for detecting an aircraft jitter as described previously in the present application. In step 920, extending the time interval for replacing the component in the aircraft where a jitter might occur. For example, for the rod end and actuating cylinder of the rudder, the maintenance time interval is changed from the required one maintenance period into four maintenance periods. In another example, since the elevator comprises four rod ends and need to be replaced at one time, in case the maintenance time interval is changed from the required two maintenance periods into four maintenance periods after application of the technical solution of the present invention, the cost for each aircraft may be reduced to CNY35,000/year in so far as only the material fee is concerned.

The present invention exactly reproduces acceleration condition and spectrum and energy distribution in each axis during an aircraft jitter, through which maintenance staff will be able to accurately determine possible sources of jitter malfunctions, and remarkably reduce time for troubleshooting the jitter malfunctions. Besides, it can extend maintenance period for the component where a jitter malfunction is likely to happen, and reduce maintenance cost for an aircraft.

The above embodiments are only described for illustrating the present invention, and do not mean to limit the present invention. Persons with ordinary technology in the art may make various changes and variations without departing from the scope of the present invention. Therefore, all equivalent technical solutions shall also belong to the scope of disclosure of the present invention.

We claim:

1. An aircraft jitter detection system for detecting jitter in the form of unstable aircraft structural oscillations, comprising: a jitter detection apparatus, arranged to detect accelerations of pitch and yaw of the aircraft; a data acquisition apparatus, arranged to obtain accelerations in two directions detected by the jitter detection apparatus; and a jitter determination apparatus, arranged to extract frequency spectrum and energy information of the jitter according to the accelerations in two directions obtained by the data acquisition apparatus, and compare the extracted frequency spectrum with a threshold value and the energy information with another threshold value to determine whether the aircraft jitters; wherein the jitter detection apparatus, the data acquisition apparatus or the message generation apparatus initiates detection of jitter during the climb or cruise stage of the aircraft; and wherein at the time when the aircraft starts to clime or around 10 seconds or 20 seconds after the aircraft starts to climb, the jitter detection apparatus, the data acquisition apparatus or the message generation apparatus initiates detection of jitter; or when the aircraft starts to climb at a speed larger than 260 knots, the jitter detection apparatus, the data acquisition apparatus or the message generation apparatus initiates detection of jitter; or when the aircraft is in a steady-state cruise condition or around 40 seconds after the aircraft is in a steady-state cruise condition, the jitter detection apparatus, the data acquisition apparatus or the message generation apparatus initiates detection of jitter.

2. The system of claim 1, further comprises: a mode comparison apparatus, arranged to estimate a component where jitter might occur by comparing frequency and direction information of the aircraft jitter with jitters caused by already-known jitter sources.

3. The system of claim 2, wherein the mode comparison apparatus is arranged to determine source of the jitter in combination with location information of the jitter.

4. The system of claim 1, wherein the jitter detection apparatus comprises an inertial navigation computer of aircraft, an inertial navigation platform or an accelerometer with a three-axis gravity acceleration sensor.

5. The system of claim 1, wherein the data acquisition apparatus comprises DMU, QAR or FDR of the aircraft, or a high frequency sampling independent hardware apparatus.

6. The system of claim 1 further comprises a message generation apparatus and a communication apparatus, the message generation apparatus being arranged to generate a jitter data message according to the acceleration data in two directions obtained by the data acquisition apparatus; the communication apparatus being arranged to transmit the jitter data message to the jitter determination apparatus on the ground via an air-ground data link system.

7. The system of claim 1 further comprises a jitter recording starting apparatus.

8. The system of claim 1, wherein the jitter determination apparatus is arranged to determine frequency spectrum and energy information of the jitter according to the acceleration in two directions within a time period obtained by the data acquisition apparatus.

9. The system of claim 8, wherein the jitter determination apparatus is arranged to process acceleration data in two directions of pitch and yaw of the aircraft within a time period via Fourier Transform, and obtains spectrum distribution of the jitter.

10. The system of claim 8, wherein the jitter determination apparatus is arranged to process acceleration data in two directions of pitch and yaw of the aircraft within a time period via Smooth-Pseudo Wigner-wille Distribution and/or Wavelet Transform, and obtains energy distribution of the jitter.

11. The system of claim 10, wherein the jitter determination apparatus is arranged to determine the occurrence of a jitter when the jitter energy exceeds a preset threshold value.

12. The system of claim 11, wherein the preset threshold value is energy density of the jitter larger than 150 db, and amplitude of the jitter after being processed via Fourier Transform larger than 0.0003 m2/s/Hz.

13. A method for detecting an aircraft jitter in the form of unstable aircraft structural oscillations, comprising: detecting accelerations of pitch and yaw of the aircraft using a jitter detection apparatus; obtaining accelerations in the two directions detected by the jitter detection apparatus using a data acquisition apparatus; extracting frequency spectrum and energy information according to the accelerations in two directions obtained by the data acquisition apparatus using a jitter determination apparatus, and comparing the extracted frequency spectrum with a threshold value and the energy information with another threshold value to determine whether the aircraft jitters using the jitter determination apparatus; and initiating detection of jitter during the climb or cruise stage of the aircraft; and wherein at the time when the aircraft starts to climb or around 10 seconds or 20 seconds after the aircraft starts to climb, initiating detection of jitter; when the aircraft starts to climb at a speed larger than 260 knots, initiating detection of jitter; or, when the aircraft is in a steady-state cruise condition or around 40 seconds after the aircraft is in a steady-state cruise condition, initiating detection of jitter.

14. The method of claim 13 further comprises estimating a component where jitter occurs by comparing frequency and direction information of the aircraft jitter with jitters caused by already-known jitter sources.

15. The method of claim 14 further comprises determining source of the jitter in combination with location information of the jitter.

16. The method of claim 13 further comprises generating a jitter data message according to acceleration data in two directions of the aircraft obtained by the data acquisition apparatus.

17. The method of claim 16 further comprises transmitting the jitter data message to the ground via an air-ground data link system.

18. The method of claim 13 further comprises processing acceleration data in two directions of pitch and yaw of the aircraft within a certain time period via Fourier Transform, and obtaining spectrum distribution of the jitter.

19. The method of claim 13 further comprises processing acceleration data in two directions of pitch and yaw of the aircraft within a certain time period via Smooth-Pseudo Wigner-ville Distribution and/or Wavelet Transform, and obtaining energy distribution of the jitter.

20. The method of claim 19 wherein the another threshold value is energy density of 150 db, and the threshold value relates to an extracted frequency spectrum fourier transform amplitude of 0.0003 $m^2$/s/Hz.

21. An aircraft jitter detection system for detecting jitter in the form of unstable aircraft structural oscillations, comprising: a jitter detection apparatus arranged to detect and process acceleration data in two directions of pitch and yaw of the aircraft within a time period via Smooth-Pseudo Wigner-wille Distribution and/or Wavelet Transform, and obtain energy distribution of the jitter; a data acquisition apparatus arranged to obtain accelerations in two directions detected by the jitter detection apparatus, and a jitter determination apparatus arranged to (a) extract frequency spectrum and energy information of the jitter according to the accelerations in the two directions obtained by the data acquisition apparatus, (b) determine frequency spectrum and energy information of the jitter according to the acceleration in two directions within a time period obtained by the data acquisition apparatus, and (c) determine the occurrence of a jitter when the jitter energy exceeds a preset threshold value, wherein the preset threshold value is energy density of the jitter larger than 150 db, and amplitude of the jitter after being processed via Fourier Transform larger than 0.0003 $m^2$/s/Hz; wherein the jitter detection apparatus, the data acquisition apparatus or the message generation apparatus initiates detection of jitter during the climb or cruise stage of the aircraft; and wherein at the time when the aircraft starts to clime or around 10 seconds or 20 seconds after the aircraft starts to climb, the jitter detection apparatus, the data acquisition apparatus or the message generation apparatus initiates detection of jitter; or when the aircraft starts to climb at a speed larger than 260 knots, the jitter detection apparatus, the data acquisition apparatus or the message generation apparatus initiates detection of jitter; or when the aircraft is in a steady-state cruise condition or around 40 seconds after the aircraft is in a steady-state cruise condition, the jitter detection apparatus, the data acquisition apparatus or the message generation apparatus initiates detection of jitter.

* * * * *